United States Patent [19]
Brown et al.

[11] Patent Number: 5,863,310
[45] Date of Patent: Jan. 26, 1999

[54] GRILL/FILTER MOUNTING ASSEMBLY

[76] Inventors: Barbara L. Brown; Ernest L. Hall, both of 6433 Kirby Trees Dr., Memphis, Tenn. 38115

[21] Appl. No.: 822,229

[22] Filed: Mar. 21, 1997

[51] Int. Cl.⁶ .................................................. B01D 25/00
[52] U.S. Cl. ........................... 55/480; 55/481; 55/490; 55/491; 55/492; 55/493; 55/495; 55/508; 55/511; 55/DIG. 31; 55/DIG. 35; 55/DIG. 37
[58] Field of Search ............................. 55/480, 481, 486, 55/490, 495, 492, 491, 493, 321, 501, 504, 505, 508, 511, DIG. 31, DIG. 35, DIG. 37

[56] References Cited

U.S. PATENT DOCUMENTS

| | | | |
|---|---|---|---|
| 943,298 | 12/1909 | Brown | 55/DIG. 35 |
| 1,616,297 | 2/1927 | Alber | 55/DIG. 35 |
| 1,726,792 | 9/1929 | Altman et al. | 55/DIG. 35 |
| 1,801,949 | 4/1931 | Broudy et al. | 55/DIG. 35 |
| 1,898,424 | 2/1933 | Collins | 55/483 |
| 1,914,397 | 6/1933 | Bender | 55/DIG. 35 |
| 3,460,322 | 8/1969 | Rivers et al. | 55/504 |
| 5,176,570 | 1/1993 | Liedl | 55/481 |
| 5,597,392 | 1/1997 | Hawkins et al. | 55/DIG. 35 |

FOREIGN PATENT DOCUMENTS

| | | | |
|---|---|---|---|
| 1187230 | 4/1970 | United Kingdom | 55/DIG. 37 |

*Primary Examiner*—Jay H. Woo
*Assistant Examiner*—Minh-Chau T. Pham
*Attorney, Agent, or Firm*—Pravel, Hewitt & Kimball

[57] ABSTRACT

A grill filter assembly for mounting in the exit or entrance wall opening of a forced air duct wherein the grill plate may be installed in a hinged relation to the duct enabling easy access to the duct opening. In a preferred embodiment, the grill face plate is adapted to have a particulate filter and/or, if desired, a scent dispenser disposed thereon and the hinged relation of the face plate enables easy access to the filter for the changing thereof. Since the grill filter assembly is adapted to be mounted directly into the exit or entrance opening of the duct, the faceplate contains no unsightly screws or other fixtures as are common on heating and air conditioning registers and face plates. In a preferred embodiment, the assembly includes match means for cooperating with the wall to expeditiously mount the assembly in the duct.

18 Claims, 4 Drawing Sheets

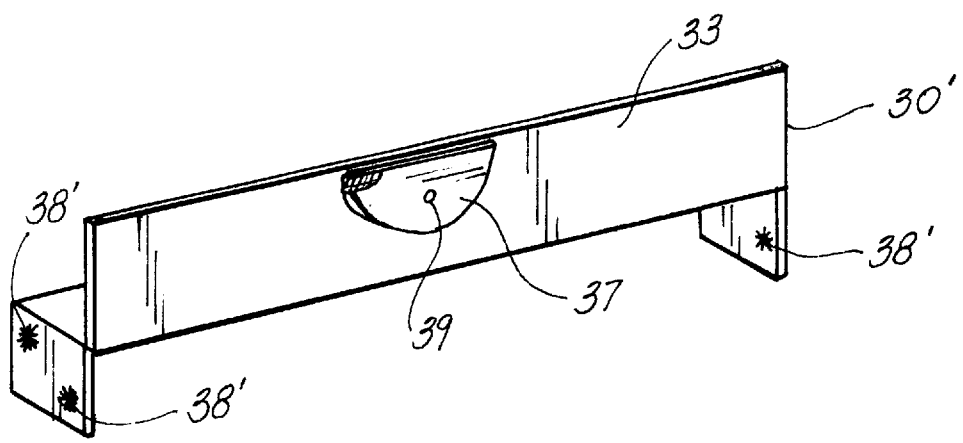
FIG. 8
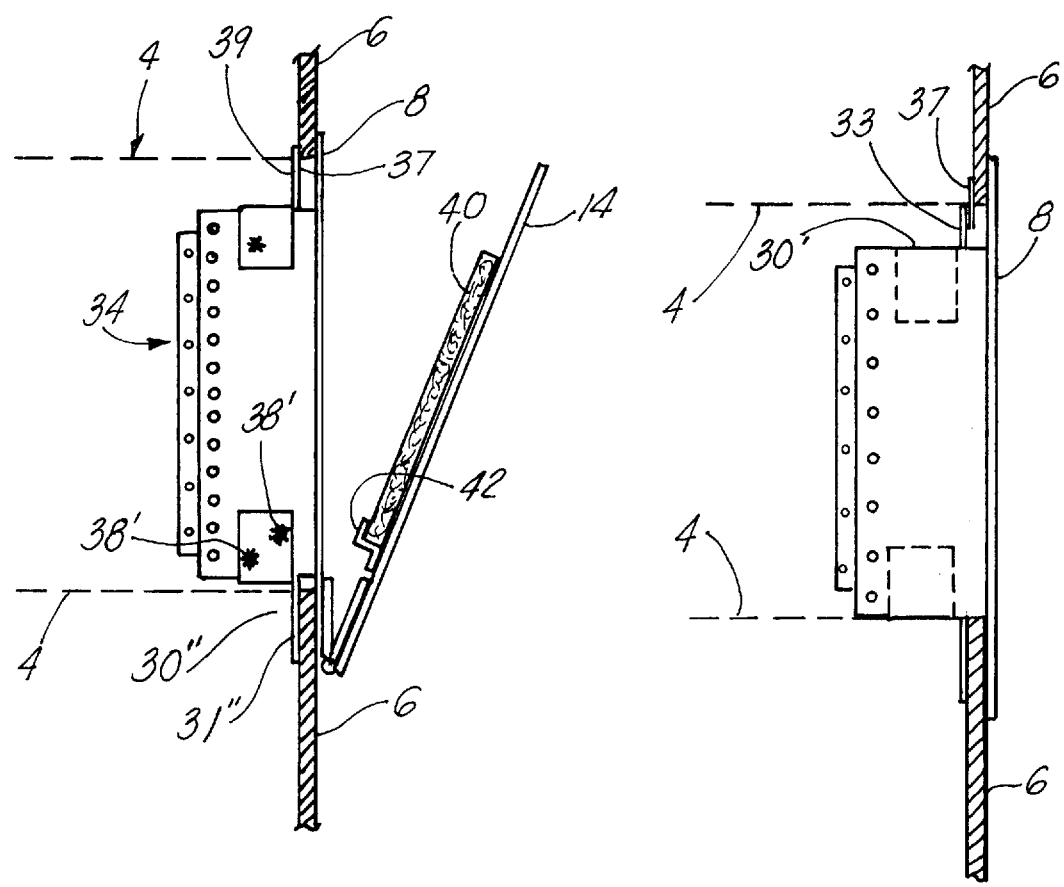
FIG. 9
FIG. 10

GRILL/FILTER MOUNTING ASSEMBLY

CROSS REFERENCE TO RELATED APPLICATIONS:

None

BACKGROUND OF THE INVENTION

The present invention relates to grill filter assemblies for forced air systems for residential and commercial heating and air conditioning systems. Most residential and commercial forced air systems include filters for purifying the air circulated therein, at least to the level of removing dust and other particulate matter. Specialized filters including chemicals or a static electric charge are available for both residential and commercial systems to enhance the removal of high levels of airborne contaminates including bacteria, moisture, odors and pollens as well as common dust and similar particulates.

Commercial and residential heating and air conditioning systems conventionally include the filter means in a central location such as the location of the blower for circulating the heated or cooled air. Most residential systems have only one blower, which is located within the housing containing the heater chamber and/or the air conditioning evaporator. As should be well appreciated, such units are located in attics, basements, utility rooms and the like, usually being out of ready access and requiring substantial effort to open the unit to gain access to the filter for replacement. Washable filters of woven or non-woven synthetic fabric or metallic thread prolong the replacement exercise by requiring the system to be down for the time the service technician removes the filter, takes it to a suitable location for cleaning and then returns for reinstallation of the filter.

As will also be appreciated, such filters for centralized systems are frequently large in order to be able to handle the air flow of the full system, and handling of such filters is a bulky and a cumbersome task. If the filter is capable of removing high levels of pollutants, as by being a part of a precipitation system, removal for cleaning or replacement is a more complicated procedure requiring additional time and thus being more expensive. For among these and other reasons, filters for centralized systems are less frequently cleaned or replaced as recommended, leading to build-up of particulate matter on the filter interfering with circulation of the air. Particulate build-up on filters also induces the circulated air to seek alternative routes (e.g., leaks) providing less back pressure to flow which may cause loss of efficiency of the over-all system and/or the circulation of unfiltered air.

While there are a number of grill filter systems which have been developed for application to either or both of forced air vents or returns, all are of complex construction or requiring significant installation procedures. U.S. Pat. No. 4,334,899 to McConnell is a multiple-framed device requiring significant preparation of the duct opening before installation of the unit. Likewise, location of the filter within the grill mechanism complicates replacement of the contained filter. Similarly, U.S. Pat. No. 5,176,570 to Leidl illustrates a grill filter assembly for a cold air return for a forced air system. This design also includes a complex frame system for surrounding and connecting to the forced air duct. According to the patent specification, the grill filter is adapted to be attached to the baseboard or wall surrounding the return duct and no interaction with the duct other than being placed in close proximity assures that the return air will be forced to flow through, rather than around the filter system.

U.S. Pat. Nos. 5,240,487 to Kung and 5,472,380 to Sarazen, et al, illustrate floor type grill registers including replaceable filters, and in '487 the capability to dispense scents into the air stream. As may be appreciated, the floor mountings of the illustrated grill filters varies substantially from the wall or ceiling mounted varieties.

SUMMARY OF THE INVENTION

It is an object of the present invention to provide a forced air grill filter assembly which is readily installed in heating and air conditioning ducts in new or replacement construction. A further object of the invention is to provide a grill filter assembly in which the filter may be readily replaced without having to dismantle the grill register assembly.

A still further object of the invention is to provide a grill filter assembly having a hinged face plate upon which the filter is supported such that there is easy access to the filter for replacement and the mounting means such as screws and the like are not visible on the grill face plate. The assembly includes mounting brackets by which the assembly may be installed directly on the forced air duct ensuring a secure registry of the grill filter with the duct opening. In preferred embodiments, mounting brackets, either singly or in combination are disposed around the forced air duct such that the grill filter becomes an integral part of the duct work such that air flowing out of the duct must flow through the grill filter and cannot escape around it.

An embodiment of the invention providing particular advantage includes preassembled brackets sized for a sliding fit into a standard sized duct. One or more of the brackets includes a flange and/or rotating or sliding clip, each of which may be positioned behind the wall or wallboard surrounding the vent opening for an expedient, screwless installation. Such a bracket assembly includes a grill/filter disposed on the face of the bracket assembly in hinged relation allowing for a ready opening of the grill filter for access such as cleaning.

Alternative embodiments of the grill filter assembly enable the filter to be advantageously mounted as either the intake or output side of floor, wall or ceiling ducts, with selective mounting of the hinged assembly to provide opening at the top or either side of the grill filter. Alternative grill face plates may be combined with the assembly in order to include, where desired and useful, adjustable louvers such that air flowing out of the grill may be selectively directed in a variety of directions.

Among the various advantages of the present invention are the ease of installation, filter replacement and cleaning of the louvered grill assembly. Once installed, the hinged grill face plate is readily opened and closed providing the user with convenient access for cleaning and servicing. The absence of screws or other fastening devices in the grill faceplate provides both a clean, cosmetic appearance and ready access to the interior of the assembly. By having a low cost intake or outlet grill filter assembly, the filtering capacity of the overall unit may be improved, with less frequent cleaning or replacement in the hard to reach central unit. Rather, input and output grill registers may be inspected readily and filters replaced selectively depending upon the condition of each filter. In such manner, higher flow ducts may be readily observed and changed more frequently than those ducts collecting lesser particulate matter. While the invention is described in context of utilizing a filter on the grill face plate, the mounting assembly including the grill face plate are advantageously used without a filter for upgrading forced air duct registers and the like.

Additional objects of the invention are set forth in the description of the invention which follows. Likewise, other advantages and objects of the invention will become apparent from reading the description of the invention and the practice of the invention in one or more of its several embodiments.

BRIEF DESCRIPTION OF THE DRAWINGS

FIG. 8 is a perspective view of an alternative embodiment of a support rail of the present invention.

FIG. 9 is a side elevation of an alternative embodiment of grill faceplate assembly of FIG. 1 including the support rail of FIG. 8.

FIG. 10 is a side elevation of the mounting bracket embodiment illustrated in FIG. 9 of the present invention illustrating its installation in a duct opening.

FIG. 11 is a perspective view of an alternative embodiment of a support rail of the present invention.

FIG. 12 is a side elevation of an alternative embodiment of grill faceplate assembly of FIG. 1 including the support rail of FIG. 11.

FIG. 13 is a side elevation of the mounting bracket embodiment illustrated in FIG. 12 of the present invention illustrating its installation in a duct opening.

FIG. 14 is a perspective view of an alternative embodiment of lower support rail of the mounting assembly illustrated in FIGS. 10 and 13.

DESCRIPTION OF THE PREFERRED EMBODIMENTS

Figure 1:
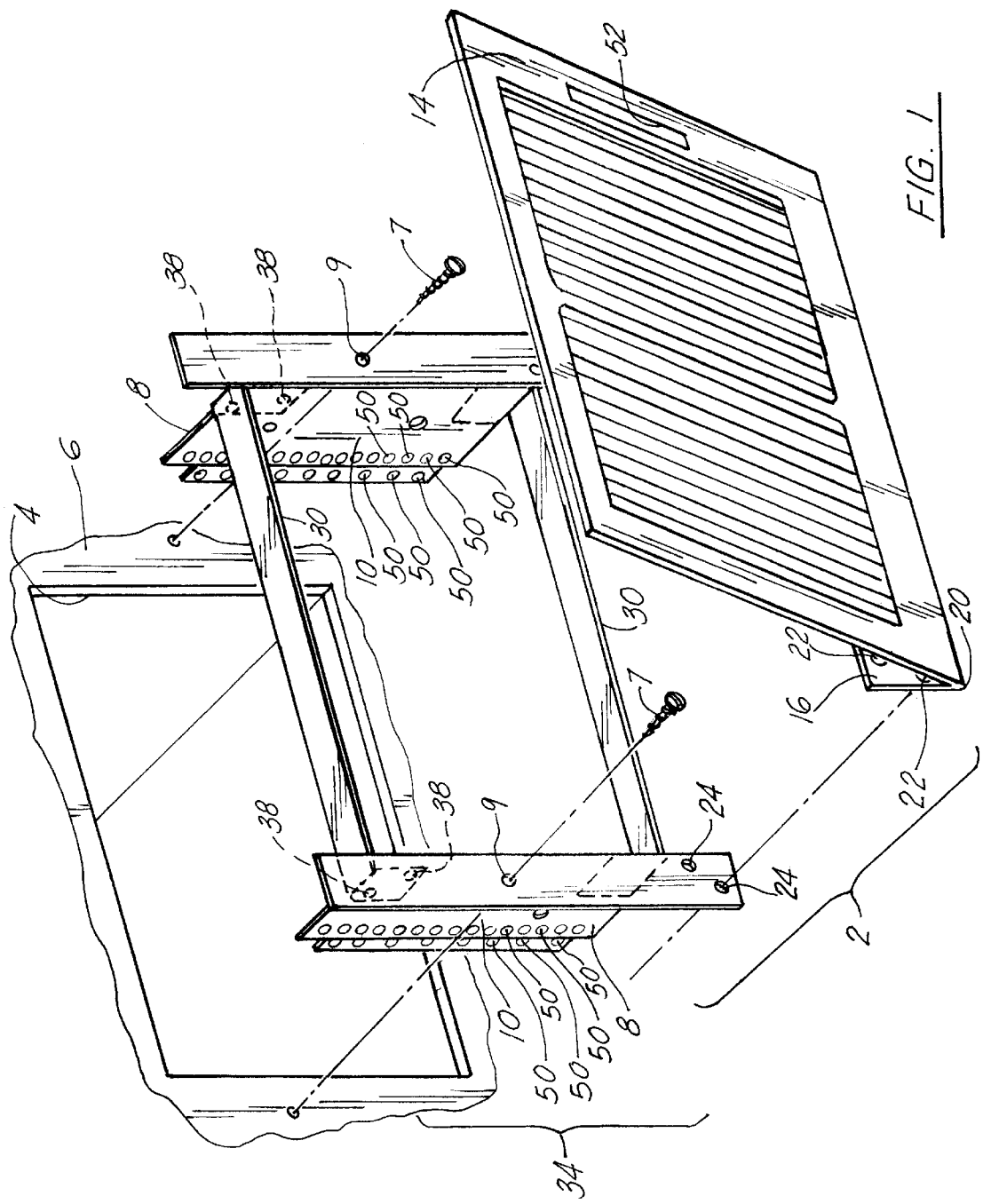
FIG. 1 is an exploded view of the mounting assembly and grill face plate for forced air systems according to the present invention.
Figure 2:
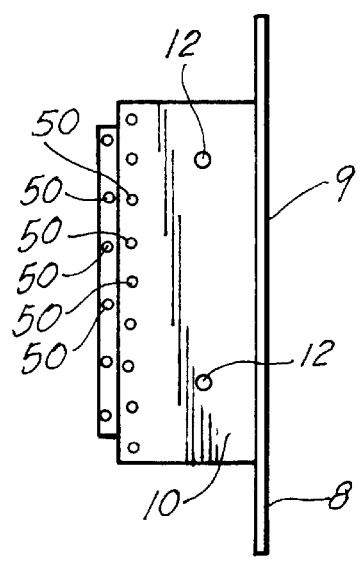
FIG. 2 is a side elevation of the mounting bracket of the present invention.
Figure 3:
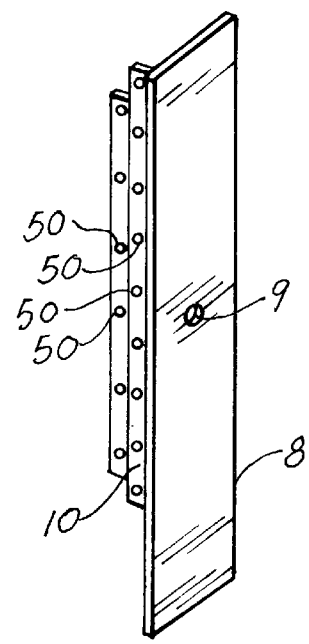
FIG. 3 is a perspective view of the mounting bracket illustrated in FIG. 2.
Figure 4:
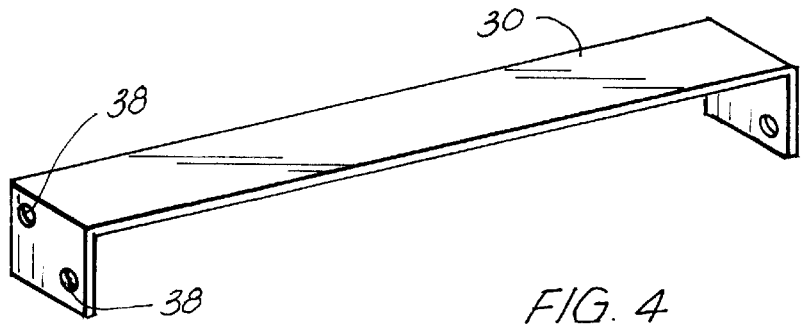
FIG. 4 is a perspective view of the support rail of the present invention.
Figure 5:
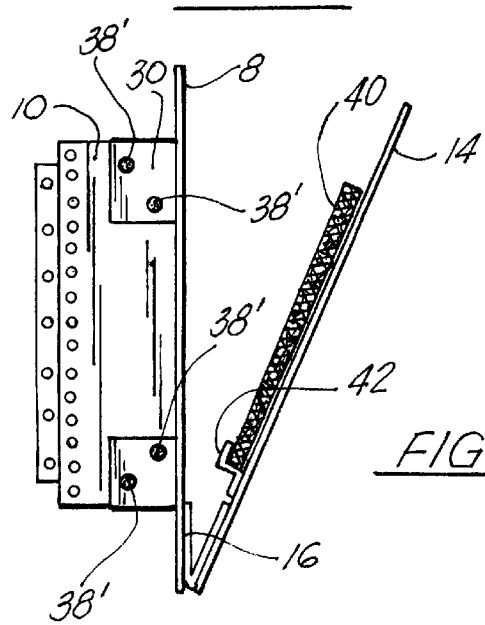
FIG. 5 is a side elevation of grill faceplate assembly of FIG. 1.

Referring now to the drawings and to FIGS. 1 and 5 in particular, reference numeral 2 indicates the assembly of a grill filter and mounting assembly adapted to be disposed in forced air duct 4 as it exits the internal wall 6 of a building, as heating and air conditioning ducts are disposed in residential and commercial buildings. In the present embodiment illustrated, wall 6 may be composed of conventional dry wall material in which the air duct 4 terminates. In frequent construction, duct 4 merely butts up against the dry wall 6, having been placed in the shell of the building prior to the application of the dry wall on the studs or similar structural support. The present invention includes mounting brackets 8 having a generally L-shaped cross section formed by duct flange 10 which is disposed into the duct 4, which in the illustrated embodiment is on the vertical sides of duct 4. Preferably, the vertical extent of flange 10 is sized according to the size of duct 4 into which installed. The sizing of air duct for buildings comes in standard sizes (in inches) such as 8×4; 8×6; 10×4, 6 and 8; 12×4, 6 and 8; and 14×4, 6 and 8, all of which are commonly used in residential construction. In such manner, flange 10 is snugly received within duct so as to provide a seal against inadvertent loss of air from the duct-grill connection. Mounting bracket 8 is conveniently secured into position at the opening of duct 4 by such as by being installed on wall 6 by screws disposed therein, through front mounting holes 9 in bracket 8.

Grill plate 14 is adapted (for top opening access) to be attached to mounting brackets as by hinges 16 which, in the illustrated embodiment, are disposed at the bottom, inside (or duct side) comers 20 of grill plate 14. It is considered within the scope of the present invention to alternatively position hinges 16 on one of said mounting brackets 8 such that grill face plate 14 rotates about an axis parallel to and adjacent a vertical edge of duct 4 (see FIG. 6). Side mounting of grill plate 14 permits an alternative, side access to the interior of assembly 2. Hinges 16 are conveniently attached to grill plate 14 as by each being welded to grill plate 14. It should be considered within the scope of the present invention to use alternative attachment means for hinges 16 on grill plate 14 including cooperating clasps, adhesives, screws and the like. While some flexibility in mounting assembly may be sacrificed, hinges 16 might be permanently mounted on brackets 8 (as by welding at spots 22 and 24 on hinges 16 and bracket 8, respectively) such that the brackets 8 and grill plate are mounted on duct 4 as a unit simplifying the installation process.

Support rail 30 is disposed intermediate mounting brackets 8, being preferably attached in pairs to duct flange 10 on the top and bottom thereof Support rails are particularly useful for the formation of a duct mounting assembly 34 composed of two mounting brackets 8 and two support rails 30 as illustrated in FIG. 1. Since duct materials utilized in residential and commercial construction come in standard sizes as described above, it is useful to have a duct mounting assembly which may be readily installed into a forced air duct opening, upon which a selected grill face plate 20 may be attached. In such manner, depending upon the customer or user preference, grill face plate 20 may include filter means (40 in FIG. 5) and/or one of a variety of combinations of adjustable louvers for the selective direction of airflow exiting the duct 4. Support rails 30 may be affixed to mounting brackets in a prebuilt assembly 34 by means of welding, adhesives, rivets or other mechanical fasteners. Where the support rails 30 are installed separately, they may be attached by such as sheet metal screws (not shown) at selected positions as are illustrated by holes 38. The welding of support rails 30 to brackets 8 may be accomplished by placing spot welds 38' identified by the character * at locations on support rails similar to the locations of holes 38. Alternatively, as will be understood by those skilled in the art of metal fabrication, a unitary bracket-support rail fabrication may be manufactured from a single, precut piece of sheet metal and conveniently joined at one corner formed by the adjoining (but unjoined) bracket and support rail.

Support rails provide a further function in the combination of a mounting assembly in that they provide a seal over the interface of the other two sides of the duct 4 and wall 6 in a manner similar to flanges 10 of bracket 8. Having effectively a sleeve formed by bracket mounting assembly 34 disposed inside duct 4 at the inlet or outlet end increases the efficiency of the overall forced air system in that the conditioned air is less likely to be drawn from outside the conditioned area as by leaks in the register/grill and duct interface. As illustrated in FIG. 1, grill filter assembly is disposed in a horizontal arrangement with mounting brackets disposed on lateral sides of duct 4 and support rails disposed on the top and bottom sides of duct 4. Those skilled in the art will recognize that orientation of brackets 8 and rails 30 is a matter of preference or convenience to an installer or user, and that brackets 8 and rails 30 may be sized to be disposed on the top and bottom and the sides, respectively of duct 4.

Figure 6:
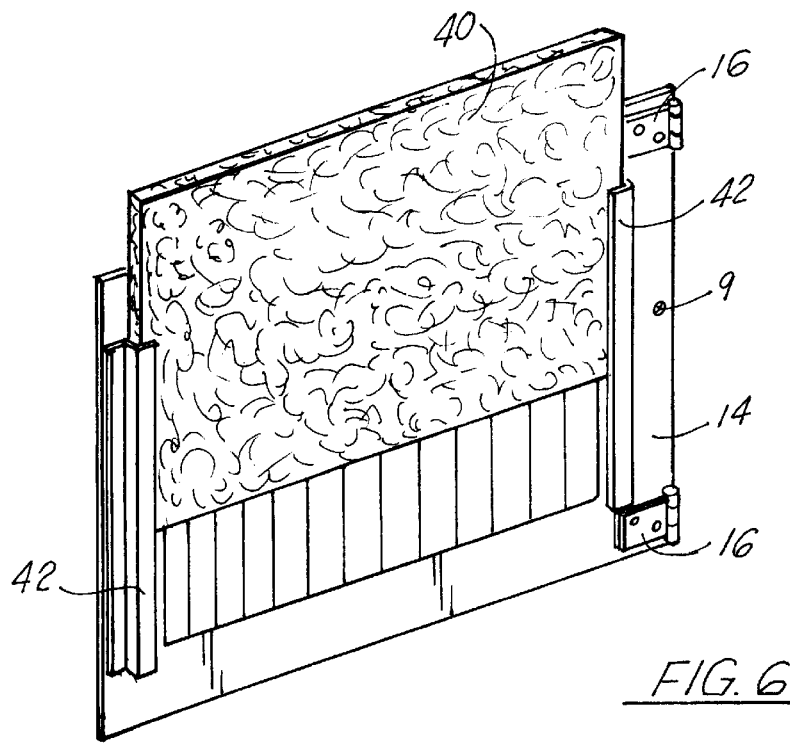
FIG. 6 is a rear perspective view of an alternative embodiment of the grill face plate of the invention.

Grill plate 14 is preferably adapted with means such as bracket 42 which in the embodiment illustrated in FIG. 1 is disposed horizontally on the lower portion of grill plate 14. As illustrated in FIGS. 5 and 6, filter 40 may be conveniently slipped into the space formed by bracket 42 and the rearward side of grill plate 14 (shown partially inserted in FIG. 6). In the embodiment illustrated, grill plate 14 is attached to mounting bracket 8 by hinges 16 such that grill plate 14 may be opened nominally such that filter 40 maybe slipped downwardly into place. Such an orientation of parts enables a quick and uncomplicated replacement of filter 40. In a preferred embodiment, hinge 16 includes spring means (not shown) urging the members of hinge 16 into closed or adjacent position such that the spring action translated to the grill plate holds grill plate 14 in a closed position in relation to the duct opening with no additional holding or latching means. Naturally, it is within the scope of those skilled in the art to utilize separate latching or holding mechanisms, if such is preferred. Likewise, holding brackets 42 may be used singly (FIG. 5) or in pairs (FIG. 6) and oriented horizontally or vertically as illustrated.

Figure 7:
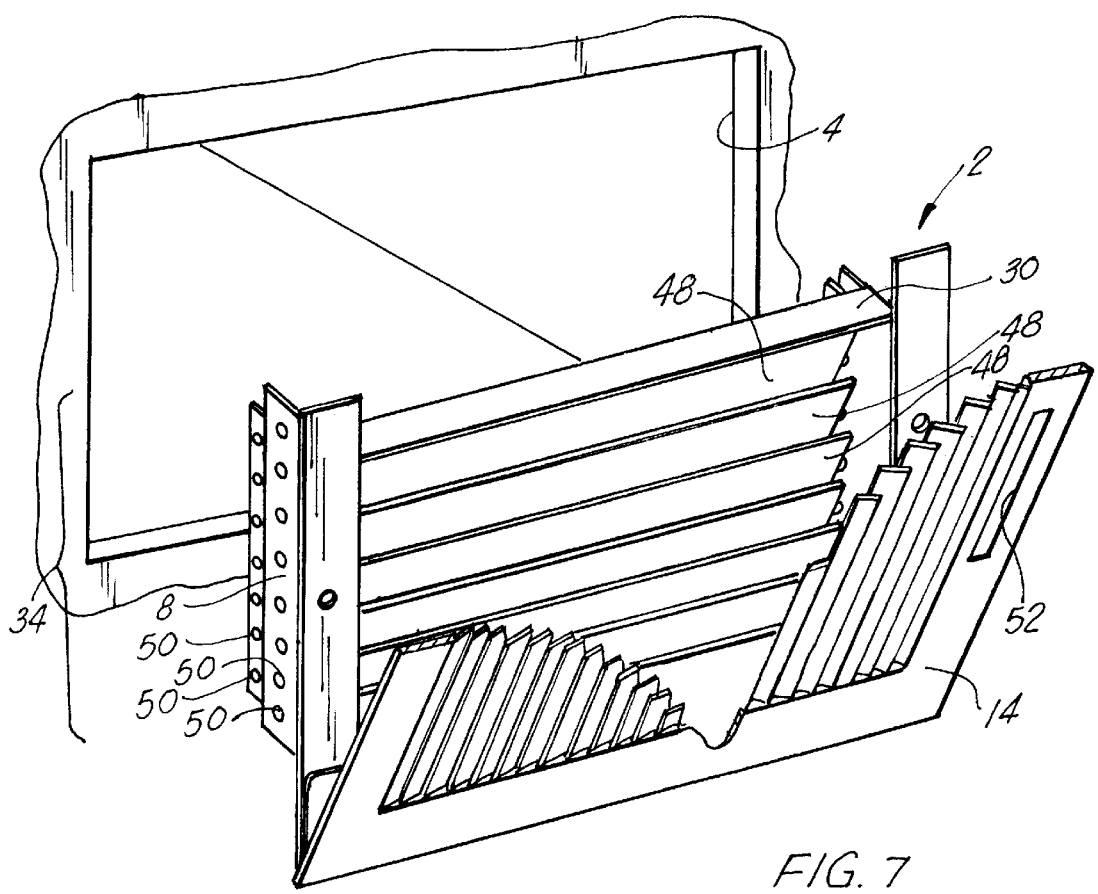
FIG. 7 is a perspective view of an alternative embodiment of the invention illustrated in FIG. 1.

Combinations of louvers 48 may be disposed in holes 50 (as further illustrated in FIG. 7) in mounting brackets 8 and connected through adjusting mechanism (not illustrated, but well known in the art) which may extend through opening 52 in grill face plate 14. In the illustrated embodiment, holes 50 are disposed in staggered, adjacent rows on bracket 8 enabling an overlap of adjacent louvers to provide better control of the airflow out of the grill plate 14. Louver systems are advantageously disposed in mounting assemblies 34 enabling a user to alter direction of air exiting a register. If it is desirable for exiting air to be controllable in a variety of directions, combinations of louvers may be also disposed in support rails 30 in a manner similar to that described for brackets 8. Control actuators may also be disposed on grill face plate 14 at opening 52.

Referring now to FIGS. 8 through 14, alternative means for the latching of mounting assembly 34 into a vent opening are illustrated. In FIG. 8, support rail 30' has disposed thereon a flange 33 extending the lateral extent of support rail 30'. Disposed on flange 33 is rotating latch 37, pivotally attached as by rivet 39. FIG. 9 illustrates assembly 34 including brackets 8, support rails 30' and 30" and grill plate 14 mounted within the opening of wall 6 adjacent duct opening (not shown). It will be noted that brackets 8 are vertically sized such that flange 33 of support rail 30' is closely received through the opening of wall 6 adjacent the duct, such that grill plate 14 may be received in a flush relationship against wall 6. FIG. 10 illustrates the rotated latch 37 positioned behind wall 6 whereby it is closely received intermediate bracket 8 and latch 37 such that assembly 34 may be quickly and securely installed into place.

FIGS. 11 through 13 illustrate an alternative embodiment of a latching mechanism for a mounting assembly 34. Support rail 30' has disposed thereon tab 31', extending downwardly from rail 30'. Disposed on tab 31' is rotary latch 37, pivotally mounted as by means of rivet 39. FIG. 12 illustrates mounting assembly 34 including the latching embodiment of FIG. 11 disposed in the opening within wall 6 where duct 4 (shown by dotted line) exits. Since tab 31' extends downwardly of rail 30', rail 30' may be assembled on brackets 8 sized such that the bracket-rail assembly may be closely received within duct 4 in a sleeved arrangement. FIG. 13 illustrates rotary latch after having been rotated counter-clockwise approximately 180 degrees so as to be positioned behind wall 6, whereby mounting assembly 34 is securely positioned within the duct 4/wall 6 opening.

FIG. 14 illustrates lower support rail 30" advantageously utilized in mounting assembly 34 including rotating latches 37 whether of the construction illustrated in FIG. 8 or 11 and related figures. Support rail 30' includes a flange 31" disposed preferably the lateral length of rail 30" and a vertical length sufficient to engage wall 6 between flange 31' and mounting bracket 8 as mounting assembly is inserted, bottom end first, into the opening of duct 4 at wall 6. In the illustrated embodiments a flange 31" vertical length is about one-half inch for a common 10×6 inch duct however, special needs influenced by wall structure or mounting location or orientation may dictate a modified vertical or horizontal dimension. As described earlier, brackets 8 are preferably sized to accommodate standard sized ducts and therefore, as bracket 8 bottoms out in duct 4, the upper portion of bracket 8 (as well as the entirety of mounting assembly 34, may be rotated into duct 4 in a close fit. Depending upon the upper supporting rail and latching mechanism chosen (two of which are illustrated in FIGS. 8 and 11), the latching mechanism may then be actuated to engage wall 6 and firmly retain mounting assembly in position. Likewise, while FIGS. 8 and 11 illustrate a rotatably latching device 37, those skilled in the art will recognize that other sliding latches may be utilized which are capable of being moved into position behind the wall 6 adjacent said duct 4 such that a mounting bracket 34 will be retained securely within the duct opening being held alternately effectively by flanges positioned respectively on the interior and exterior of said wall. The described means for retaining the mounting assembly 34 in position eliminates the need for any screws or similar attaching means enabling an expeditious mounting of a grill filter assembly either in an initial installation or for replacement or cleaning.

As will be apparent to persons skilled in the art, various additional modifications, adaptations and variations of the foregoing specifically disclosed embodiments can be made without departing form the objectives and scope of the present invention;

Accordingly, we claim:

1. In combination with a duct for a forced air system, a grill assembly disposed in a rectangular duct opening in a wall surface of a room into which said duct terminates including;

a pair of mounting brackets fixedly mounted on opposite sides of said rectangular duct adjacent the duct opening;

said mounting brackets formed in a generally L-shaped cross section having a first side and a second side, said first side having a length to be received and fixedly mounted within said duct adjacent the opening;

said second side of said bracket disposed adjacent and overlying the outside wall surface at the duct opening when said bracket is fixedly secured in said duct;

at least one of said mounting brackets having hinge means including an axis about which hinge members of said hinge swing, one of said hinge members of said hinge means being fixedly secured on said second side of said mounting bracket oriented such that the axis of said hinge means is generally parallel to and adjacent one of the rectangular sides of the duct opening;

a grill plate, mounted on said at least one said mounting brackets having hinge means, containing an air flow opening disposed in close proximity to and over said duct opening, said grill plate having a rectangular shape corresponding to the shape of said duct opening and having a size larger than the duct opening to cover the duct opening and said mounting bracket; and a closure device disposed on said grill assembly to retain said grill plate in a closed position over the duct opening.

2. A grill assembly according to claim 1 wherein said assembly includes at least one stabilizing attached to the first side of said mounting brackets and extending therebetween, disposed adjacent to one of the other sides of said duct.

3. A grill assembly according to claim 1 wherein said grill plate air opening includes louvers for directing air flow transiting said grill plate.

4. A grill assembly according to claim 2 wherein said mounting brackets are adapted to receive moveable louvers disposed intermediate said brackets in rows extending from adjacent one side of said duct opening and parallel thereto, to adjacent the opposite wall of said duct whereby movement of said louvers will regulate the flow of air exiting said duct.

5. A grill assembly according to claim 1 wherein said grill[face] plate is adapted with a retaining bracket on the duct side thereof for receiving and retaining thereon a particulate filter disposed over said air flow opening in said face plate.

6. A grill assembly according to claim 2 wherein said assembly includes a second stabilizing bracket disposed between said mounting brackets and extending adjacent said side of said duct opposite said first stabilizing bracket thereby forming a generally rectangular assembly for being closely received within said duct opening.

7. A grill assembly according to claim 5 wherein said grill plate retaining bracket is disposed adjacent to the lower edge of said grill plate.

8. A grill assembly according to claim 5 wherein said grill plate retaining bracket is disposed adjacent a vertical edge of said grill plate.

9. A grill assembly according to claim 1 wherein hinge means is located on each of said mounting brackets whereby said grill plate swings about an axis parallel to the a side of said duct opening between said mounting brackets.

10. A grill assembly according to claim 9 wherein said hinge means are located on said mounting brackets adjacent the lower edge of said duct opening whereby said gill plate swings on an axis adjacent said lower edge of said duct opening.

11. A grill assembly according to claim 1 wherein said closure device is a spring device in said hinge means, preloaded to hold said grill plate in a closed position relative to said duct opening.

12. A grill assembly according to claim 1 wherein said hinge means is located on one of said mounting brackets whereby said grill plate swings about an axis parallel to the edge of said duct opening wherein said mounting bracket is mounted.

13. A grill filter assembly for mounting in the a duct opening of a rectangular, forced air duct terminating in a wall surface of a room in a building comprising:

a pair of side mounting brackets fixedly secured on opposite sides of said rectangular duct, adjacent the duct opening;

said mounting brackets formed in a generally L-shaped cross section having a first side and a second side, said first side having a length received and mounted within said duct adjacent the duct opening, said second side disposed adjacent the outside wall surface at the duct opening when said bracket is fixedly secured in said duct, at least one of said mounting bracket having hinge means for mounting and retaining thereon a grill plate containing an air flow opening disposed in close proximity to the duct opening;

a pair of stabilizing brackets disposed respectively adjacent the other opposite sides of said rectangular duct extending between said pair of mounting brackets and fixedly attached thereto forming a rectangular frame inside said duct;

said grill plate of said grill assembly having a rectangular shape corresponding to the shape of said duct opening and having a size larger than the duct opening to cover the duct opening and said mounting bracket;

said grill plate being fixedly secured to said hinge means on at least one of said mounting brackets, said hinge means having a swing axis being adjacent one side of said duct at the opening whereby said plate may swing about said hinge means axis from a closed position covering the duct opening to an open position; and a closure device disposed on said grill assembly to selectively retain said grill plate in the closed position.

14. A grill assembly according to claim 13 wherein said grill plate air opening includes louvers for directing air flow transiting said gill plate.

15. A grill assembly according to claim 13 wherein said mounting brackets are adapted to receive moveable louvers disposed intermediate said brackets in rows extending from adjacent one side of said duct opening and parallel thereto, to adjacent the opposite wall of said duct whereby movement of said louvers will regulate the flow of air exiting said duct.

16. A grill assembly according to claim 13 wherein said grill plate is adapted with a retaining bracket on the duct side thereof for receiving and retaining thereon a particulate filter disposed over said air flow opening in said gill plate.

17. A grill assembly according to claim 13 wherein said hinge means are located on said mounting brackets adjacent the lower edge of said duct opening whereby said gill plate swings on an axis adjacent said lower edge of said duct opening.

18. A grill assembly according to claim 13 wherein said closure device is a spring device in said hinge means, reloaded to hold said gill plate in a closed position relative to said duct opening.

* * * * *